(12) United States Patent
Fischer et al.

(10) Patent No.: US 8,790,617 B2
(45) Date of Patent: Jul. 29, 2014

(54) PROCESS FOR PRODUCING HYDROGEN WITH COMPLETE CAPTURE OF $CO_2$ AND RECYCLING UNCONVERTED METHANE

(75) Inventors: Beatrice Fischer, Lyons (FR); Fabrice Giroudiere, Orlienas (FR); Jean-Louis Ambrosino, Ternay (FR); Michel Thomas, Lyons (FR)

(73) Assignee: IFP Energies nouvelles, Rueil-Malmaison Cedex (FR)

( * ) Notice: Subject to any disclaimer, the term of this patent is extended or adjusted under 35 U.S.C. 154(b) by 611 days.

(21) Appl. No.: 12/568,317

(22) Filed: Sep. 28, 2009

(65) Prior Publication Data
US 2010/0080754 A1 Apr. 1, 2010

(30) Foreign Application Priority Data

Sep. 29, 2008 (FR) ...................................... 08 05390

(51) Int. Cl.
*C01B 3/26* (2006.01)
(52) U.S. Cl.
USPC .......................... 423/652; 423/648.1; 423/650
(58) Field of Classification Search
USPC ........................................ 423/648.1, 650, 652
See application file for complete search history.

(56) References Cited

U.S. PATENT DOCUMENTS

| | | | |
|---|---|---|---|
| 4,582,630 A * | 4/1986 | Quang et al. ................... | 252/373 |
| 4,695,442 A | 9/1987 | Pinto et al. | |
| 4,910,007 A | 3/1990 | Pinto et al. | |
| 5,430,303 A * | 7/1995 | Matsumoto et al. ........ | 250/492.2 |
| 5,669,960 A | 9/1997 | Couche | |
| 6,521,143 B1 | 2/2003 | Genkin et al. | |
| 6,645,446 B1 * | 11/2003 | Won et al. ...................... | 423/210 |
| 2003/0191196 A1 | 10/2003 | Madhubhai et al. | |
| 2005/0210881 A1 | 9/2005 | Balan et al. | |
| 2006/0213368 A1 * | 9/2006 | Kita et al. ........................... | 96/4 |
| 2006/0236861 A1 * | 10/2006 | Patel et al. ........................ | 95/96 |

FOREIGN PATENT DOCUMENTS

| | | |
|---|---|---|
| EP | 1 146 009 A | 10/2001 |
| EP | 1 582 502 A | 10/2005 |
| WO | WO 2008/081102 A | 7/2008 |

OTHER PUBLICATIONS

"International Search Report", International Application No. FR 08/05.390, date of maililng Apr. 22, 2009, pp. 2.

* cited by examiner

*Primary Examiner* — Paul Wartalowicz
(74) *Attorney, Agent, or Firm* — Millen, White, Zelano & Branigan, P.C.

(57) ABSTRACT

The present invention concerns a process for producing hydrogen from a hydrocarbon feed and steam, comprising:
- a step for producing a synthesis gas in a unit for steam reforming the hydrocarbon feed in the presence of steam, with a fuel providing the heat necessary for the reaction;
- a step for steam converting synthesis gas obtained in the preceding step, producing a stream of hydrogen containing methane and carbon dioxide;
- a step for capturing carbon dioxide present in the stream obtained from the steam conversion step in order to separate the carbon dioxide from the stream of hydrogen;
- a step for capturing and recycling the methane and other impurities (CO, $CO_2$) present in the stream of hydrogen to the steam reforming step.

13 Claims, 6 Drawing Sheets

PROCESS FOR PRODUCING HYDROGEN WITH COMPLETE CAPTURE OF CO₂ AND RECYCLING UNCONVERTED METHANE

The present invention relates to the field of hydrogen production, and more particularly to a process for producing hydrogen with complete capture of $CO_2$ and recycling the unconverted methane.

Global warming which according to the international scientific community has been observed since the industrial age, could dramatically modify the climates and ecosystems of many regions of the globe. Greenhouse gas emissions, in particular carbon dioxide ($CO_2$), appear to be responsible for this warming.

Fossil fuels (natural gas, oil, coal) constitute a large proportion of readily available fuel on the planet. However, such fossil fuels, when used, produce $CO_2$ (generally during a combustion step) and thus contribute to global warming.

One recommended solution to combating global warming by greenhouse gas emissions is to capture the $CO_2$ which is produced, then to store it underground. A number of possibilities have been explored, including capture by pre-combustion which consists of converting the fossil fuel into hydrogen with capture and storage of the $CO_2$ which is also produced. Hydrogen, the energy vector, can then be burned freely without emitting a greenhouse gas.

There are currently several methods for producing hydrogen on an industrial scale from fossil fuel. The most popular method is steam reforming natural gas carried out in a furnace (SMR, steam methane reforming), which has the advantage of using a feed with a high hydrogen/carbon ratio because of the high methane content of its composition. In simplified manner, the catalytic SMR reaction can be written as follows:

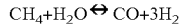

$$CH_4 + H_2O \leftrightarrow CO + 3H_2$$

This highly endothermic reaction is equilibrated. It is favoured by high temperatures and is generally carried out in a furnace heated by a fuel such as natural gas. Conventionally, the SMR unit is followed by a step for steam conversion (WGS: water gas shift) which can maximize the hydrogen production by the following reaction:

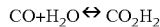

$$CO + H_2O \leftrightarrow CO_2 H_2$$

When $CO_2$ is to be captured for storage, it is then possible to use an amine washing unit (activated MDEA, for example) which will extract the $CO_2$ from the hydrogen-rich stream, which is then sent, for example, to a gas turbine in order to produce electricity, while the $CO_2$ is compressed and sent underground.

In that type of process the aim of capturing $CO_2$ is not achieved at all as not only does $CO_2$ still remain at the turbine outlet due to the presence of methane, CO and $CO_2$ still present in the hydrogen, but also more natural gas is required at the inlet because it is sent directly to the turbine. Further, the furnace in which the steam reforming is carried out uses natural gas, and thus emits a great deal of $CO_2$. The $CO_2$ sequestration ratio is thus low.

One improvement to that technique consists of adding an adsorption unit using a pressure-modulated molecular sieve for impurities adsorption (PSA). Two streams are currently obtained: a 99.99% pure hydrogen stream and a stream of impurities containing at least 20% hydrogen. This low pressure stream is sent to the burners for the steam reforming furnace, which reduces the amount of natural gas necessary for the furnace, and thus reduces $CO_2$ production. However, the $CO_2$ sequestration ratio remains low, since some of the impurities will leave in the form of $CO_2$ in the furnace fumes, and also more hydrogen has to be produced and thus more natural gas has to be used for the steam reforming feed.

Thus, the present invention aims to overcome one or more of the disadvantages of the prior art by proposing a process for producing hydrogen which can capture the impurities present at the end of production, in particular methane, and recycle them to the steam reforming step without energy loss.

To this end, the present invention proposes a process for producing hydrogen from a hydrocarbon feed and steam, comprising:
  a step for producing a synthesis gas in a unit for steam reforming the hydrocarbon feed in the presence of steam, with a fuel providing the heat necessary for the reaction;
  a step for steam converting synthesis gas obtained in the preceding step, producing a stream of hydrogen containing methane and carbon dioxide;
  a step for capturing carbon dioxide present in the stream obtained from the steam conversion step in order to separate the carbon dioxide from the stream of hydrogen;
  a step for capturing and recycling the methane and other impurities present in the stream of hydrogen to the steam reforming step.

In accordance with one implementation of the invention, the hydrocarbon feed is natural gas.

In the hydrogen production process of the invention, the step for capturing and recycling the impurities is carried out in an adsorption unit comprising at least two adsorbers and comprises at least the following phases in succession:
  adsorbing the impurities on the first adsorber;
  regenerating the first adsorber and adsorbing the impurities on the second adsorber.

In accordance with one implementation of the invention, the adsorber regeneration phase is carried out as follows:
  isolating the adsorber when it is saturated and bringing the second adsorber on-line;
  flushing the first adsorber with a stream of a hydrocarbon feed intended to act as the feed for the steam reforming unit and heated by exchange with steam also intended for the steam reforming unit, to a temperature which is at least 20° C. higher than the steam condensation temperature;
  regenerating the heated adsorber and desorbing the impurities by circulating steam superheated by at least 20° C. intended for the steam reforming unit;
  eliminating steam present in the regenerated adsorber by flushing the ads order with a stream of pure hot hydrogen;
  flushing the adsorber freed of steam with a stream of pure cold hydrogen.

In one implementation of the invention, the step for adsorbing the impurities is carried out at a temperature in the range 20° C. to 100° C.

In one implementation of the invention, the adsorption step is carried out with an activated charcoal or carbon molecular sieve type adsorbant.

In accordance with one implementation of the invention, the adsorption step is carried out with a charcoal prepared by physical steam activation.

In accordance with one implementation of the invention, the adsorption step is carried out with an activated charcoal containing micropores with a diameter of less than 2 nm, the macropores having a diameter of more than 50 nm, and a smaller quantity of mesopores with a diameter in the range 2 to 50 nm.

In the hydrogen production process of the invention, the adsorbed impurities are methane, carbon dioxide and carbon monoxide.

In accordance with one implementation of the invention, a portion of the hot hydrogen stream saturated with steam obtained after flushing the regenerated adsorber is sent to the burners for the reforming unit, and the other portion of the stream is sent as a mixture with the diluting steam to a gas turbine in order to produce electricity.

In accordance with one implementation of the invention, a portion of the cold hydrogen stream obtained after flushing the regenerated adsorber is sent to an external unit while the remainder of the hydrogen is used for hot flushing then sent to the burners of the reforming unit.

In accordance with one implementation of the invention, the heated hydrogen stream obtained after the adsorber cooling phase is heated again by exchange with steam and used in the phase for eliminating steam present in the adsorber.

In accordance with one implementation of the invention, the synthesis gas production step is carried out at a pressure in the range 2.5 MPa to 3.5 MPa.

In accordance with one implementation of the invention, the carbon dioxide capture step is carried out in an amine unit using methyldiethylamine and at least one other amine.

Other characteristics and advantages of the invention will be better understood and made clearer from the following description made with reference to the accompanying drawings and given by way of example:

Figure 1:
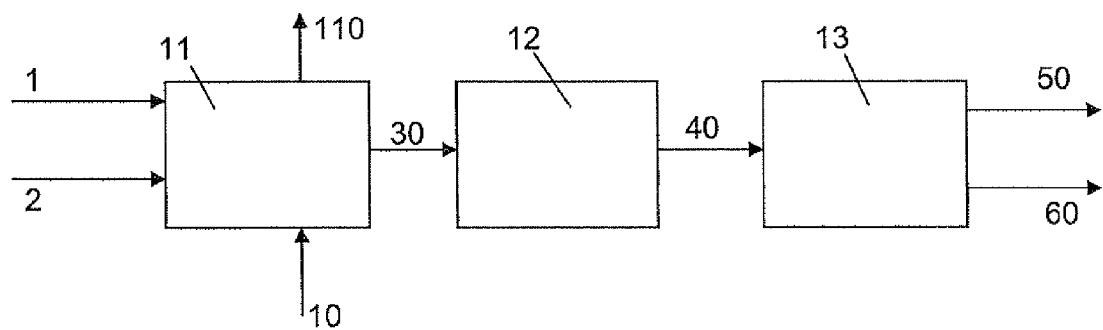
FIG. 1 shows a conventional flowchart for the prior art hydrogen production process.
Figure 2:
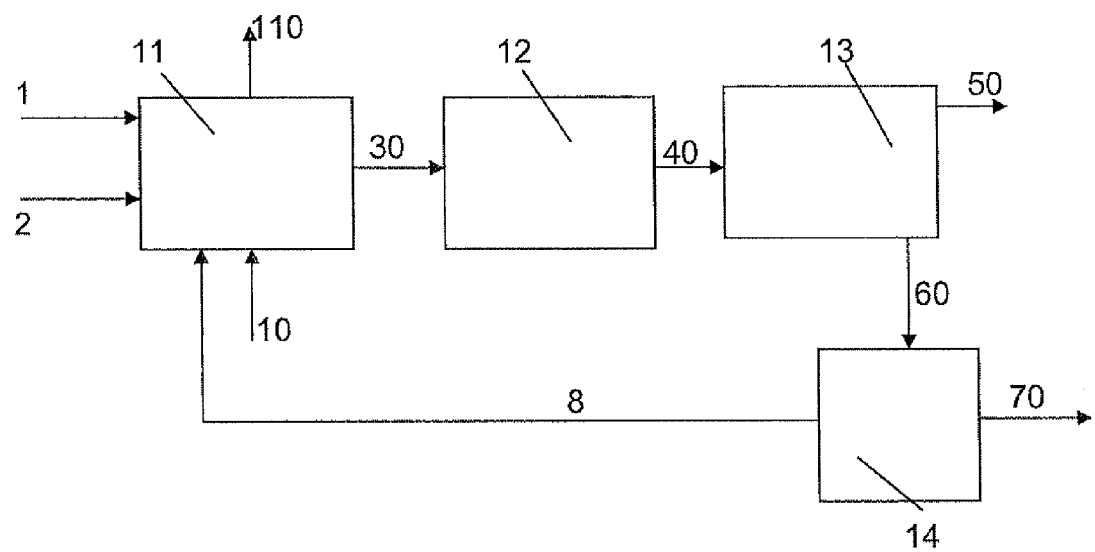
FIG. 2 shows a variation of the conventional flowchart for a prior art hydrogen production process.
Figure 3:
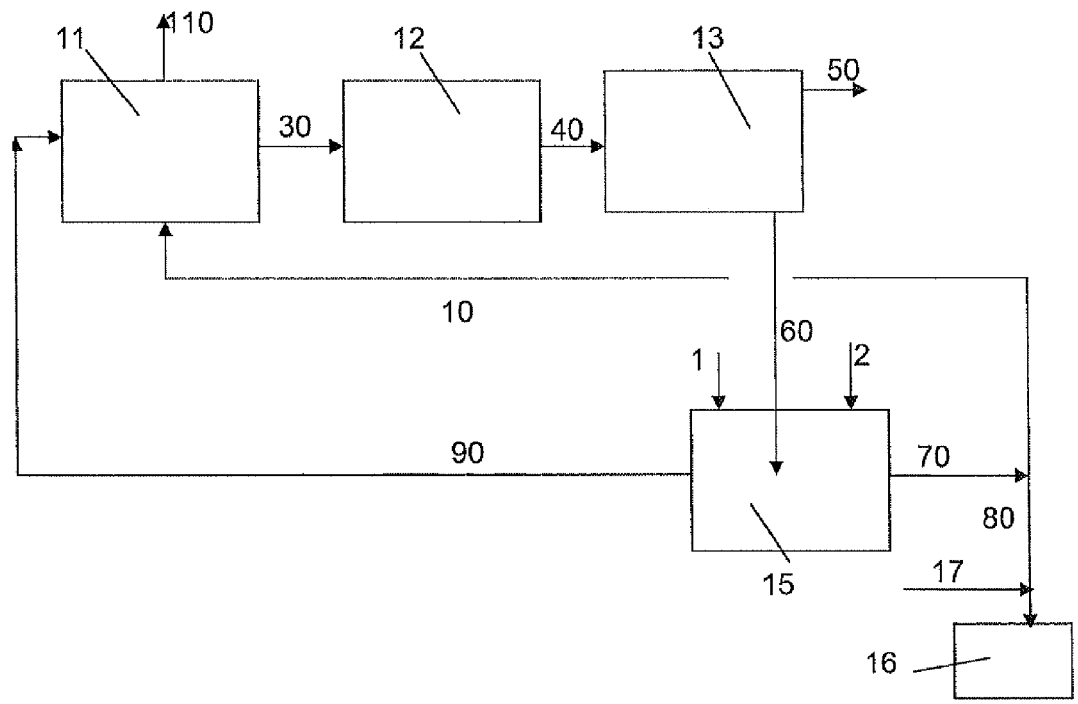
FIG. 3 shows a variation of the hydrogen production flowchart of the invention.

As can be seen in FIGS. 1, 2 and 3, during a process for producing hydrogen, a natural gas stream moving in a line 1 and a stream of steam moving in a line 2 are sent as a feed to a steam reforming unit 11. The heat necessary for the reaction is produced by a stream of fuel, for example natural gas, sent to the steam reforming furnace via a line 10. This reaction produces a stream of fumes containing carbonic gas at the furnace outlet 110. The stream of synthesis gas moving in a line 30 obtained by the steam reforming reaction principally contains hydrogen ($H_2$), carbon monoxide (CO), carbon dioxide ($CO_2$) as well as steam ($H_2O$) and a little unreacted methane ($CH_4$) since the reaction is equilibrated, and also at a temperature of 900° C., approximately 4% of unreacted methane remains. This stream of synthesis gas is sent via the line 30 to the steam conversion unit 12. In this unit, most of the carbon monoxide is converted into carbon dioxide using steam, at the same time liberating a little more hydrogen. This reaction too is equilibrated, and in the end a little carbon monoxide remains (0.5% under high conversion conditions). At the outlet from the conversion unit 12, the conversion stream obtained moving in a line 40 essentially contains hydrogen and carbon dioxide. This stream moving in a line 40 also contains a little methane and carbon monoxide, the remainder of the steam having been condensed after the steam conversion reactors.

The conversion stream is then sent to a $CO_2$ capture unit 13 which may be an amine unit; an amine unit using methyldiethylamine (MDEA) in combination with at least one other amine is particularly suitable. It is possible to use other $CO_2$ capture units which are well known to the skilled person.

The essential portion of the $CO_2$ is separated and sent via a line 50 to a compression and drying unit for subsequent transport to a reinjection site such as an exhausted field or a suitable geological stratum.

The hydrogen-rich gas is evacuated via another line 60. This gas includes a little methane, carbon monoxide and a little non captured carbon dioxide (approximately 0.5%).

In the process of the invention, this hydrogen-rich gas is directed to an activated charcoal adsorption unit 15, in contrast to the prior art where it is directed towards a unit for adsorbing impurities on a molecular sieve, 14, with pressure modulation (PSA process). In this latter case 99.99% pure hydrogen is evacuated via a line 70 while approximately 20% of the hydrogen is sent to a purge 8 with all of the impurities (FIG. 2).

In the adsorption unit 15 used in the process of the invention, which may thus, for example, be operated over activated charcoal or any other solid adsorbant as described in the examples below, regeneration is carried out at high pressure using steam supplied via a line 2. This steam is then used as the feed for the steam reforming unit supplied via the line 90. The impurities ($CH_4$, CO, $CO_2$) are thus recycled to the steam reforming reactor. In order not to have $CO_2$ emitted by the steam reforming furnace, a portion of the hydrogen produced leaving via the line 70 is used in the steam reforming unit. A portion of the hydrogen from line 70 is thus sent to the burners for the steam reforming unit via the line 10 so that the fumes leaving via the line 110 do not contain $CO_2$. The remainder of the hydrogen is sent via the line 80 to the gas turbine 16 mixed with diluting steam arriving via the line 17. In this configuration, the $CO_2$ sequestration ratio may be close to 100%.

Figure 4:
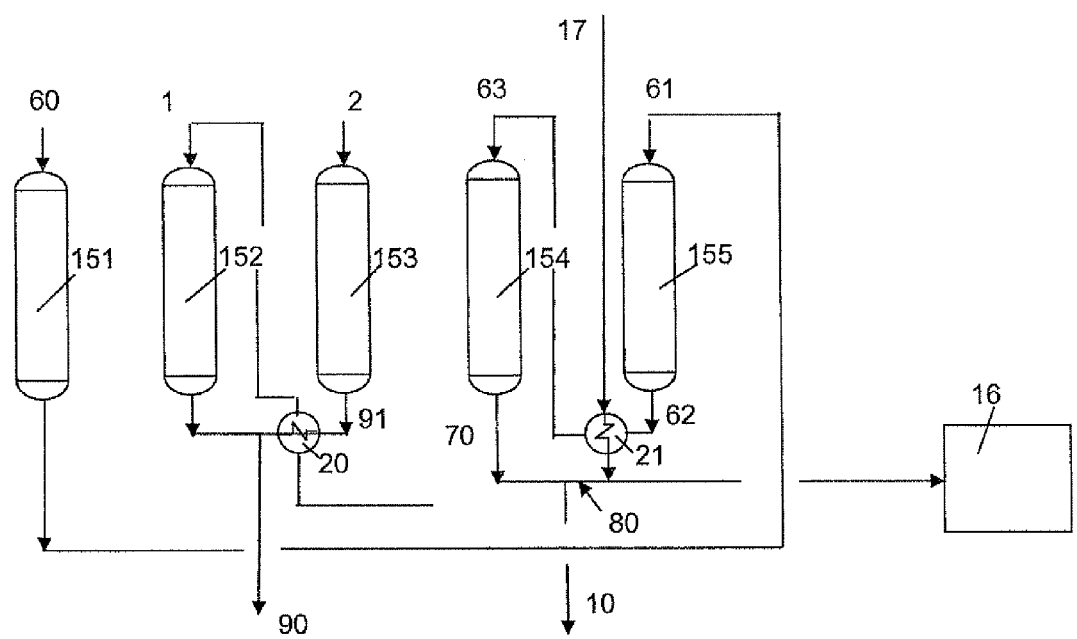
FIG. 4 shows a detail of the adsorption unit of the hydrogen production flowchart of the invention.

The adsorption unit 15 used in the present invention is constituted by several adsorbers, also termed capacities (151 to 155). The operational mode is illustrated in FIG. 4 in a configuration with 5 adsorbers, which configuration is non-limiting. This adsorption unit is supplied with feed methane, necessary for the subsequent purge and pressurization phases, via the line 1. A different number of capacities is clearly possible without departing from the scope of the present invention, for example 5 to 10, but we have limited ourselves to 5 in order to explain the invention more simply.

Figure 12:
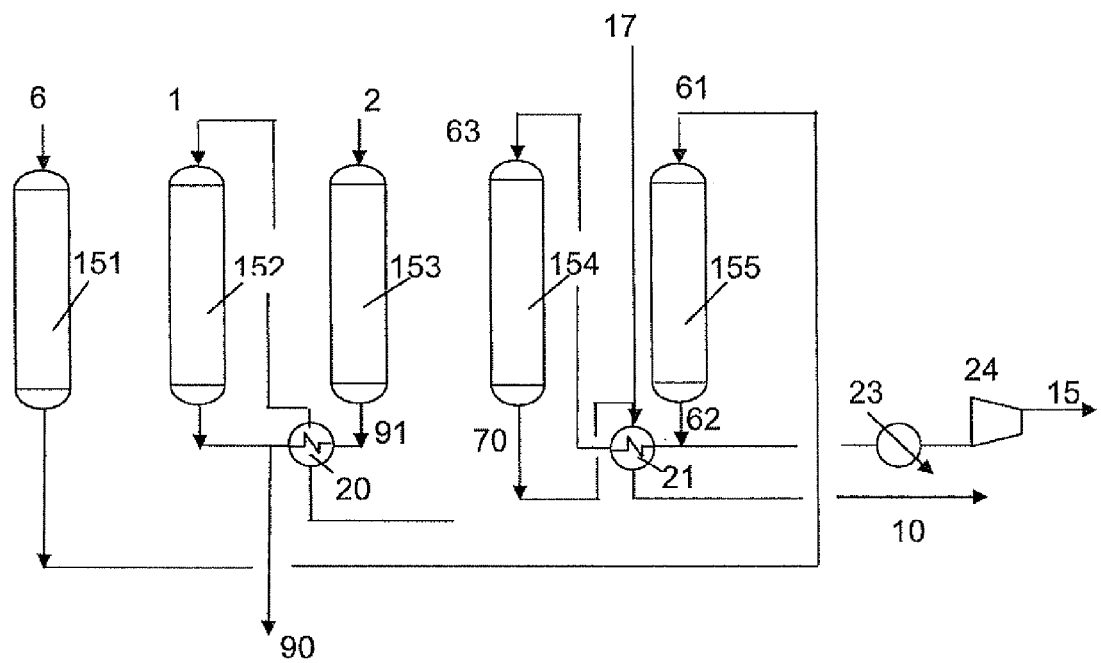
FIG. 12 shows a variation of the flowchart for producing pure hydrogen (not mixed with steam) in accordance with the invention.

The adsorption cycle in the adsorption unit 15 is constituted by several phases. The five capacities 151 to 155 are filled with adsorbant. The stream of hydrogen-rich gas to be purified arriving via the line 60 is sent to the first capacity 151 at a temperature in the range 20° C. to 100° C., preferably in the range 40° C. to 80° C., and more preferably in the range 30° C. to 70° C. Methane, CO and $CO_2$ contained in this stream are captured on the adsorbant and purified hydrogen exits via the line 61. The hydrogen moving in the line 61 is then sent to the fifth capacity 155 to cool it to the operational temperature which is in the range 20° C. to 100° C. The heated hydrogen exits the fifth capacity via the line 62 and is sent to a heat exchanger 21 to be further heated by exchange with diluting steam arriving via the line 17. The hot hydrogen leaves the heat exchanger 21 via the line 63 at a temperature which is at least 20° C. higher than the condensation temperature of steam at the operating pressure. The hot hydrogen which is supplied to the fourth capacity 154 via the line 63 can evacuate the steam remaining in the capacity after the regeneration step. Part of this steam is sent as a mixture with the hydrogen to the burners of the steam reforming burners via the line 10 and part is sent to the gas turbine 16 via the line 80. In a variation illustrated in FIG. 12, part of the hydrogen moving in the line 62 is removed at the outlet from the capacity 155, cooled by the heat exchanger 23 using cooling water or air, and compressed by the compressor 24. Thus, a stream of pure hydrogen is sent, for example, to an external unit for external consumers via the line 15. The reminder of the hydrogen from line 62 is heated by the exchanger 21 before flushing the capacity 154, leaves this capacity via the line 70, is then mixed with diluting steam 17, is cooled by the exchanger 21 and is sent as a fuel to the steam reforming furnace via the line 10.

The third capacity 153 is flushed with steam supplied via the line 2. The steam charged with methane and $CO_2$ is evacuated from the third capacity 153 via the line 91, is cooled slightly in a second heat exchanger 20 by exchange with natural gas arriving via the line 1 then mixed with natural gas coming from the second capacity 152 to then be sent to the steam reforming unit via the line 90.

The second capacity 152 is initially brought to the pressure of the natural gas, which is approximately 3.5 MPa, then heated gradually by flushing with hot natural gas (250° C. to 350° C.) arriving via the line 1 after pre-heating by exchange with steam supplied via the line 91.

Figure 5:
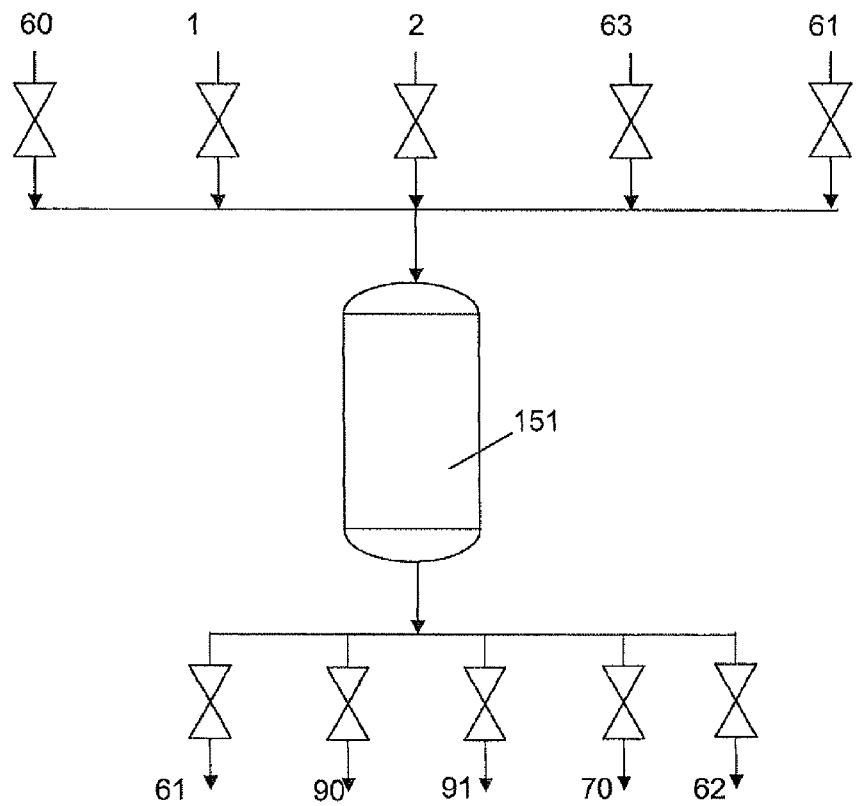
FIG. 5 shows a detail of a portion of the adsorption unit for the hydrogen production flowchart of the invention.

FIG. 5 shows one of the capacities or adsorbers, for example the first, 151, containing the adsorbant substance which may be activated charcoal. The lines 60, 1, 2, 63 and 61 respectively supplying the hydrogen to be purified, natural gas, steam, pure hot hydrogen and pure cold hydrogen, are connected to the capacity with valves which mean that each of the circuits can be isolated. The lines 61, 90, 91, 70 and 62 respectively evacuating pure cold hydrogen, methane to the steam reforming unit, steam to the steam reforming unit, pure hydrogen saturated with steam and pure hydrogen, are also connected to the capacity with isolation valves.

In this Figure and for simplification, we show the inlet for all of the incoming flows at the top of the capacity and all the exits are at the bottom, but this is solely one possibility and any other configuration is possible without departing from the scope of the invention.

Figure 6:
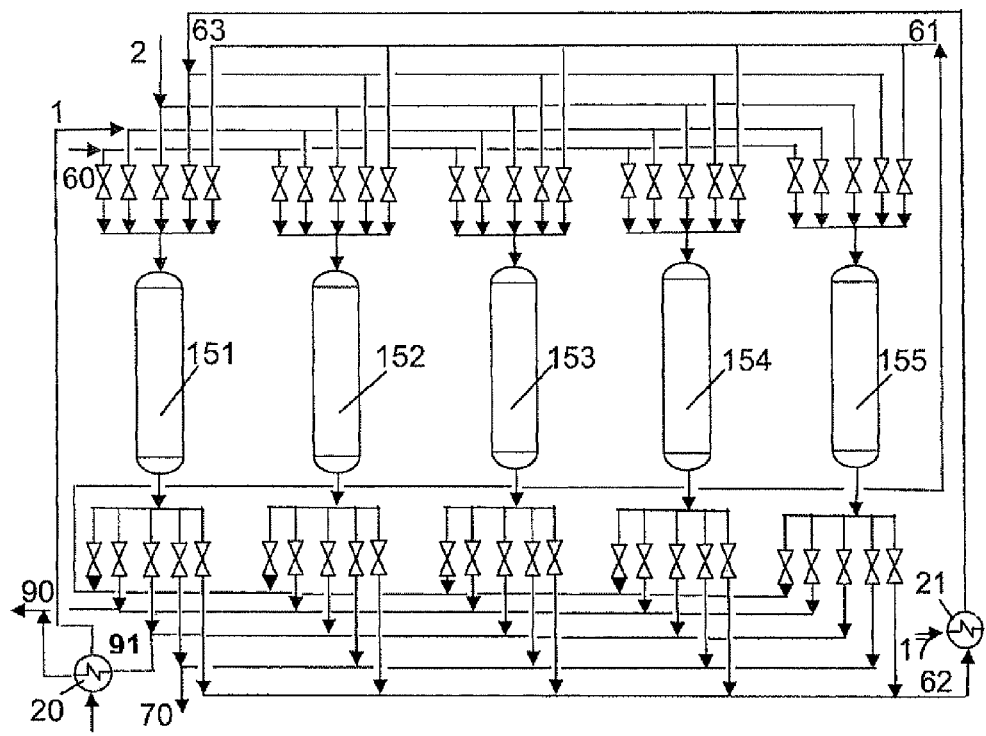
FIG. 6 shows the arrangement of the valve regulation for the adsorbers for the adsorption unit.

FIG. 6 shows the arrangement of five capacities or adsorbers in parallel (151, 152, 153, 154 and 155) which means that the unit can be operated continuously. In this case too, a different number of capacities is clearly possible without departing from the scope of the present invention, but we have limited ourselves to five in order to be able to explain the invention more simply.

Figure 7:
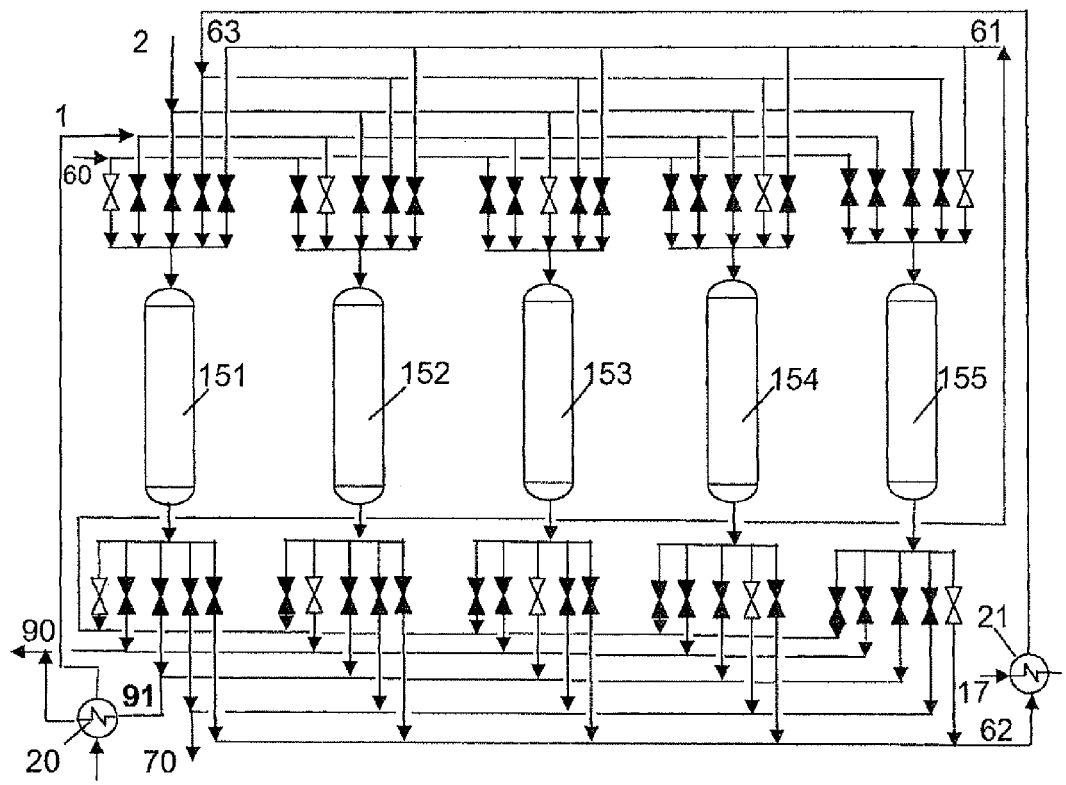
FIG. 7 shows a phase of the hydrogen production flowchart of the invention.

FIG. 7 shows a first phase of the operation of the adsorption cycle. The solid valves (in black) are closed and the others are open. The first capacity 151 receives cold impure hydrogen via the line 60, retains the various impurities on the adsorbant and pure hydrogen leaves via the line 61. The second capacity 152 has just been removed from the circuit and commences regeneration. Firstly, pressurization is carried out using hot methane arriving via the line 1, then the adsorbant is heated by the methane to a temperature is in the range 250° C. to 350° C. so that there is no risk that the steam then used for regeneration will condense out (vapour tension of water 2.5 MPa at approximately 225° C., 3.5 MPa at approximately 245° C.). The methane leaving the adsorbant is sent to the steam reforming unit via the line 90.

During this first phase, the third capacity 153 is being regenerated: superheated steam is supplied via the line 2 and can desorb the methane, CO and $CO_2$ present on the adsorbant. The mixture of steam, methane and impurities will be sent to the steam reforming unit via the line 91 mixed with methane from the second capacity 152.

The fourth capacity 154 is being purged of steam by dint of the movement of pure hot hydrogen supplied via the line 63 and returned via the line 70. The fifth capacity 155 is being cooled by pure cold hydrogen supplied via the line 61; pure hydrogen is returned via the line 62.

Figure 8:
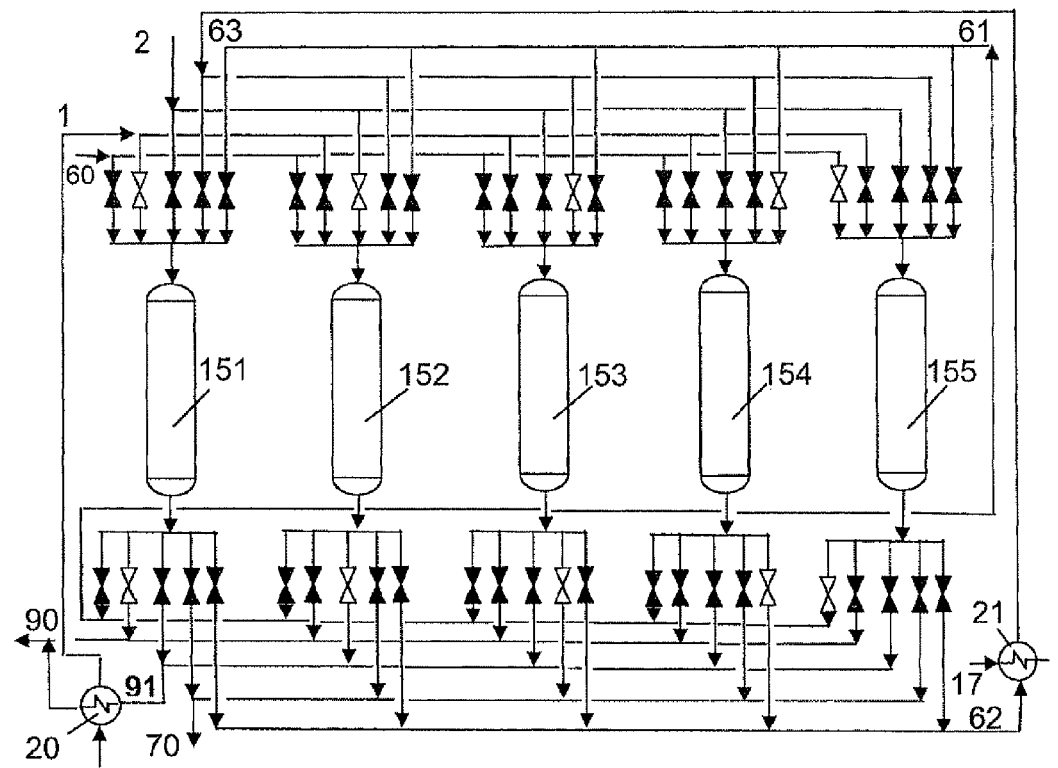
FIG. 8 shows another phase of the hydrogen production flowchart of the invention.

FIG. 8 shows the following phase: the first capacity 151 moves into pressurization mode and heating mode, the second capacity is being regenerated, the third capacity 153 is being purged, the fourth capacity 154 is being cooled and the fifth capacity 155 is on-line for hydrogen to be purified.

Figure 9:
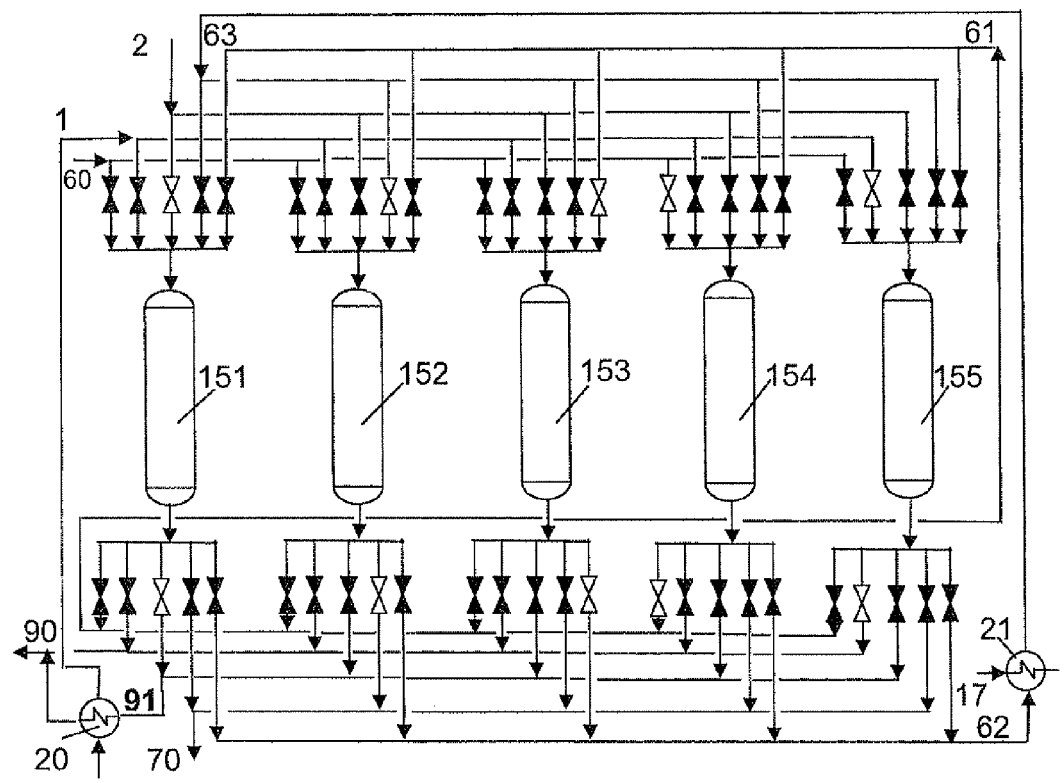
FIG. 9 shows another phase of the hydrogen production flowchart of the invention.

FIG. 9 shows the third phase of the operation: the first capacity 151 changes to steam circulation mode, the second capacity 152 is being purged, the third capacity 153 is being cooled, the fourth capacity 154 is in hydrogen purification mode and the fifth capacity 155 is being heated by methane.

Figure 10:
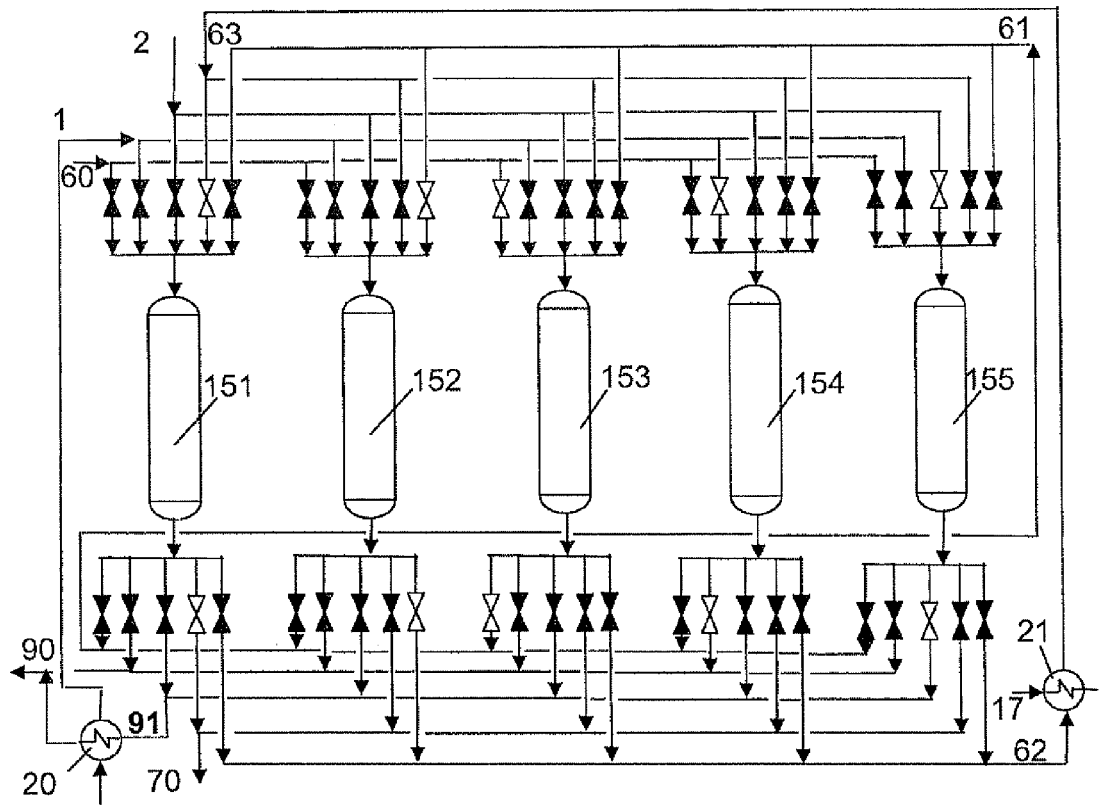
FIG. 10 shows another phase of the hydrogen production flowchart of the invention.

FIG. 10 shows the fourth operational phase: the first capacity 151 moves into purge mode, the second capacity 152 is being cooled, the third capacity 153 is in hydrogen purification mode, the fourth capacity 154 is being heated by methane and the fifth capacity 155 moves into steam circulation mode.

Figure 11:
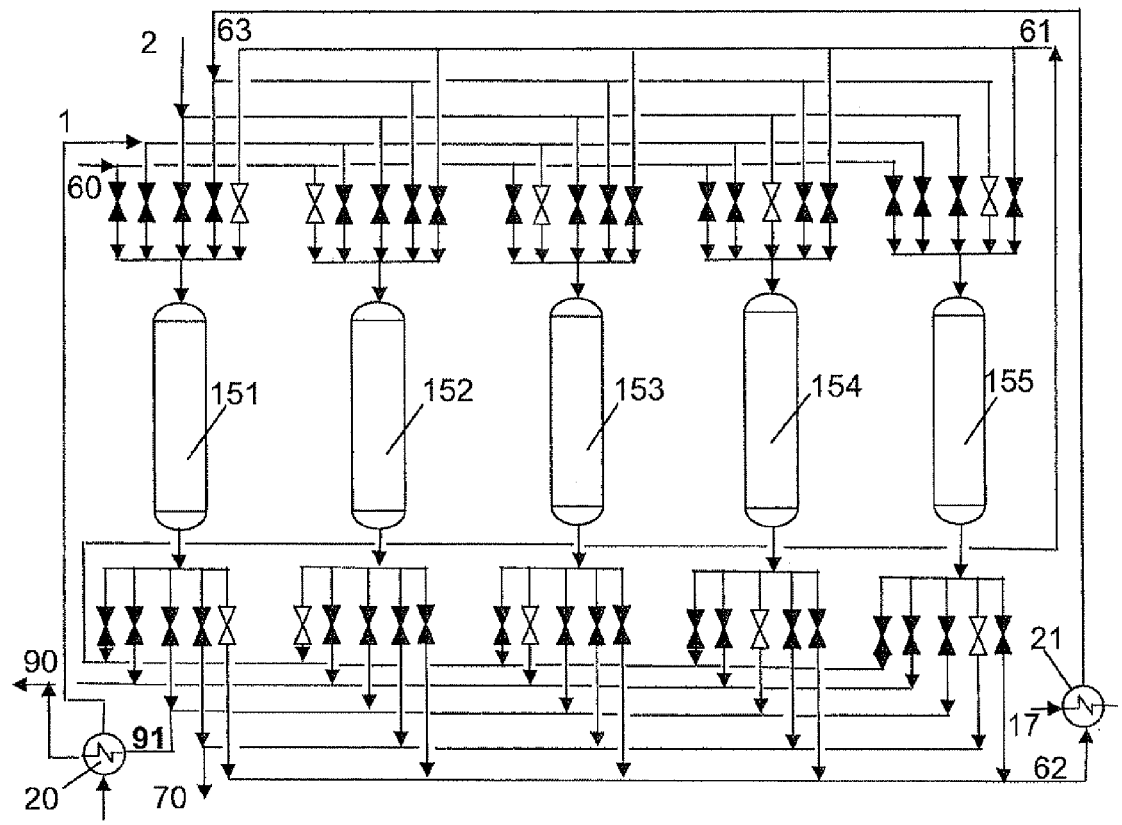
FIG. 11 shows another phase of the hydrogen production flowchart of the invention.

FIG. 11 shows the fifth operational phase: the first capacity 151 is being cooled, the second capacity 152 is in hydrogen purification mode, the third capacity 153 is being heated by methane, the fourth capacity 154 moves into steam circulation mode and the fifth capacity 155 moves into purge mode.

The cycle is complete and the next phase is similar to the first phase.

The operating conditions and the composition of the various streams during the process are summarized in Table A below in the case, for example, of a steam reforming operating at 3.3 MPa.

TABLE A

| Stream number | Composition | Pressure (MPa) | Temperature (° C.) |
|---|---|---|---|
| 1 | Natural gas (principally $CH_4$) | 3.5 | 300 (after pre-heating) |
| 2 | $H_2O$ | 3.5 | 350 |
| 60 | $H_2$, $CH_4$, $H_2O$, $\epsilon CO$, $\epsilon CO_2$ | 2.6 | 62 |
| 61 | $H_2$ | 2.5 | 62 |
| 62 | $H_2$ | 2.5 | 62-300 |
| 63 | $H_2$ | 2.5 | 300 |
| 70 | $H_2 + H_2O$ | 2.5 | 300 |
| 90 | $CH_4$, $H_2O$, $\epsilon CO$, $\epsilon CO_2$ | 3.4 | 320 |

The process of the invention can thus be used to capture impurities ($CH_4$, CO, $CO_2$) present in the hydrogen-rich stream (leaving the amine wash) and return them under pressure with the steam reforming feed. This process can be summarized as follows:

This process, which is cyclic, uses a plurality of capacities and comprises at least the following steps in succession:

step 1: adsorption of methane, CO and $CO_2$ in the hydrogen-rich stream onto an adsorbant. This step is carried out at low temperature in the range 20° C. to 100° C., preferably in the range 40° C. to 80° C., and highly preferably in the range 30° C. to 70° C. Pure hydrogen leaves this step. The adsorbant may, for example, be activated charcoal. Once the adsorbant is close to saturation, the capacity is isolated from the circuit, and another capacity is brought on-line;

step 2: the pressure in the capacity isolated in the preceding step is then increased and it is heated up with the process feed (natural gas) available under pressure at the end of the unit and generally pre-heated to approximately 150° C. in the steam reforming unit. The natural gas is heated to approximately 300° C. by exchange with steam before being sent to the adsorbant bed. The movement of hot natural gas in the capacity reheats the bed of adsorbant and the walls to a temperature which is at least 20° C. higher than the steam condensation temperature at the operating pressure (255° C. at 3.5 MPa), which thus avoids any risk of condensation during the next step;

step 3: the adsorbant for the reheated capacity is then regenerated by circulating the steam used at the steam reforming inlet. The steam allows the impurities (principally $CH_4$) to be desorbed from the adsorbant and sends them to the steam reforming reactor. Steam leaving the capacity is sent to an exchanger to heat up the natural gas intended for pre-heating;

step 4: the capacity is then isolated then flushed with pure hot hydrogen to remove the steam still present in the capacity. Part of the hot steam-saturated hydrogen is then sent to the burners for the steam reforming furnace and the remainder as a mixture with diluting steam to the gas turbine. Current turbines cannot function on pure hydrogen but the skilled person could make a few adaptations to allow it to function with a mixture of 50% hydrogen and steam;

step 5: the capacity is cooled by flushing with pure cold hydrogen. The heated hydrogen at the capacity outlet is heated up further by exchange with dilution steam before being sent to step 4.

This process is distinguished from the PSA (pressure swing adsorption) process used in the prior art in that the pressure of the process fluctuates only slightly (the amplitude of the pressure fluctuations corresponds only to the total pressure drop of the hydrogen production line: in the example, the pressure varies between 3.1 and 3.7 MPa, i.e. only a 0.6 MPa pressure difference). Desorption is not carried out by reducing the total pressure but by flushing with steam which has a dual effect: thermal desorption and reduction of the partial pressure of the $CH_4$.

Thus, this invention has the following advantages:
it can capture almost all of the $CO_2$;
it can recycle methane under pressure to the inlet to the steam reforming unit without a compressor, and thus with no energy loss;
it can relax the constraint on specifications regarding the amount of $CO_2$ to be captured in the upstream amine washing unit and thus reduce the associated energy consumption.

The following examples illustrate the invention.

EXAMPLE 1

In Accordance with the Invention

A flow of hydrogen-rich gas leaving a deacidification unit (MDEA) at 5300 kmol/h was treated at a pressure of 2.6 MPa and at a temperature of 57° C. to extract methane in particular in order to recycle it to a steam reforming unit (SMR).

The molar composition of this gas was as follows:
$H_2$: 92.9%
$CH_4$: 5.4%
CO: 1.0%
$CO_2$: 0.1%
$H_2O$: 0.6%

It was intended to capture most of the methane from this gas, which represented a mass flow rate of approximately 4600 kg/h.

An activated charcoal formed into extrudates with a mean diameter of 3.5 mm was used. The microporous volume, determined by nitrogen adsorption at 77K, was 0.505 $cm^3/g$, the mesoporous volume was 0.129 $cm^3/g$, and the macroporous volume, determined by mercury porosimetry, was 0.394 $cm^3/g$. Its BET specific surface area was 1263 $m^2/g$.

The adsorption capacity for methane on this activated charcoal, for a partial pressure of 0.143 MPa at 57° C., was 1.1% by weight.

In order to remove the methane, an adsorber was used with the following characteristics: an internal diameter of 3.9 m and a total bed height of 14.2 m. The quantity of activated charcoal used was 70 t. The surface velocity of the hydrogen to be purified was 1.5 m/min. The adsorption cycle time was 10 min.

The bed of adsorbant was regenerated using the following sequences:
pressurization of adsorber from 2.6 MPa to 3.5 MPa over 3 minutes using natural gas acting as a feed for the steam reforming unit;
counter-current desorption of the preceding phase using superheated steam, the inlet temperature being 380° C. and the pressure being 3.5 MPa. The flow rate of the steam used was 50 t/h, for 7 minutes; the surface velocity was 4.3 m/min;
depressurizing the adsorber to 2.6 MPa over 3 minutes, evacuation of the superheated steam still present in the adsorber using purified hydrogen obtained during step 1, at a flow rate of 7 t/h for 7 minutes.

Under these conditions, 95% of the methane was removed from the stream of hydrogen. This methane could thus be recycled to the steam reforming unit directly without a compressor, and thus with no loss of energy. Recycling the methane constitutes a saving on the quantities used.

EXAMPLE 2

In Accordance with the Invention

400 MW of electricity was to be produced using a combined cycle (gas turbine+recovery of heat at the turbine outlet with the production of steam and steam turbines).

A natural gas was provided at 7 MPa and at 40° C. having the following molar composition:
$CH_4$: 91%
$C_2H_6$: 6%
$C_3H_8$: 1%
$CO_2$: 2%

After steam reforming, steam conversion and activated MDEA absorption, the gas produced was at 2.6 MPa, 57° C. and had the following molar composition:
$H_2$: 92.9%
$CH_4$: 5.4%
CO: 1%
$CO_2$: 0.1%

H$_2$O: 0.6%

It was superheated by 5° C. so that it was no longer saturated and to prevent any condensation of water on the adsorbant.

The pure hydrogen flow rate required for the turbine was 284700 Nm$^3$/h.

The pure hydrogen flow rate required for the steam reforming furnaces was 256350 Nm$^3$/h.

The hydrogen flow rate at the separation inlet was 557280 Nm$^3$/h.

The natural gas flow rate was 166387 Nm$^3$/h.

The steam flow rate for steam reforming (3.6 MPa, 380° C.) was 476314 Nm$^3$/h.

The diluting steam flow rate was 284700 Nm$^3$/h.

Step 1:

During this step, the hydrogen leaving the deacidification unit (MDEA) was purified, by adsorption of CH$_4$ in particular.

The pressure was in the range 1 to 10 MPa, preferably in the range 2 to 8 MPa, and highly preferably in the range 1.5 to 4 MPa, and the temperature was in the range 20° C. to 100° C., preferably in the range 40° C. to 80° C.

The flow rate of the gas was in the range 0.5 to 20 m/min, preferably in the range 1 to 10 m/min.

The adsorption phase period was in the range 1 to 60 minutes, preferably in the range 1 to 30 minutes, and preferably in the range 1 to 15 minutes.

Step 2:

During this step, the adsorber was pressurized, essentially containing hydrogen to be purified, using natural gas. The pressure variation was that existing between the pressure of the hydrogen to be purified and the pressure of the superheated steam which was available.

The pressure was increased at a rate in the range 0.05 to 2 MPa/min, preferably in the range 0.1 to 1 MPa/min, and more preferably in the range 0.2 to 0.5 MPa/min.

The temperature was in the range 20° C. to 400° C., preferably in the range 50° C. to 300° C.

Step 3:

During this step, desorption of the adsorbed compounds was carried out, in particular desorption of CH$_4$ using superheated steam.

The pressure was in the range 1 to 10 MPa, preferably in the range 2 to 8 MPa, and highly preferably in the range 1.5 to 4 MPa, and the temperature was in the range 20° C. to 400° C., more preferably in the range 50° C. to 300° C.

The gas flow rate was in the range 0.5 to 20 m/min, preferably in the range 1 to 10 m/min.

The desorption phase period was in the range 1 to 180 minutes, preferably in the range 1 to 30 minutes, and more preferably in the range 1 to 15 minutes.

The desorption phase period could be selected such that the temperature of the steam at the adsorber outlet was more than 5° C. above the dew point of the steam at the pressure under consideration. Proceeding in this manner means that the risk of water condensing in the mesopores of the adsorbant is greatly limited.

Step 4:

During this step, a purge of the residual steam still contained in the adsorber at the end of desorption step 3 was carried out.

The pressure was in the range 1 to 10 MPa, preferably in the range 2 to 8 MPa, and the temperature was in the range 20° C. to 400° C., preferably in the range 50° C. to 300° C.

The flow rate of the gas was in the range 0.5 to 20 m/min, preferably in the range 1 to 10 m/min.

The duration of this purge phase was in the range 1 to 180 minutes, preferably in the range 1 to 30 minutes, and preferably in the range 1 to 15 minutes.

The duration of this purge phase could be selected so as to flush the adsorber with a volume of gas in the range, for example, from 1 to 100 volumes of the adsorber, preferably in the range 2 to 50 volumes of adsorber.

The gas used in this step could, for example, be all or part of the purified hydrogen produced during step 5 or step 1.

Step 5:

During this step, the adsorber, which had just been purged of residual superheated steam in step 4, was cooled.

The pressure was in the range 1 to 10 MPa, preferably in the range 2 to 8 MPa, and the temperature was in the range 20° C. to 200° C., preferably in the range 50° C. to 100° C.

The flow rate of the gas was in the range 0.5 to 20 m/min, preferably in the range 1 to 10 m/min.

The duration of the adsorbant cooling phase was in the range 1 to 180 minutes, preferably in the range 1 to 30 minutes, and more preferably in the range 1 to 15 minutes.

The gas used in this step could, for example, be all or part of the purified hydrogen produced during step 1.

Adsorbant Solid:

In accordance with the invention, the step for desorption of the impurities present in the hydrogen and adsorbed onto the solid is carried out using superheated steam. The adsorbant solid must be capable of resisting high temperatures, typically in the range from ambient temperature to 350° C., in the presence of superheated steam. In accordance with the invention, the adsorbant is selected from adsorbants of the activated charcoal or carbon molecular sieve types.

Preferred examples from the activated charcoal group which can be selected are activated charcoals which have been prepared by physical activation using steam, rather than chemical activation using an acid, for example. The activation conditions are more severe than those encountered under the conditions of the invention, in particular as regards the temperature which is generally in the range 600° C. to 900° C.

Preferably, an activated charcoal is selected which essentially contains micropores with a typical diameter of less than 2 nm and macropores with a diameter of more than 50 nm, and the lowest possible quantity of mesopores (diameters in the range 2 to 50 nm). These diameters can be calculated using nitrogen adsorption isotherms at 77K using, for example, the BJH method (mesopore region) which is well known to the skilled person, and mercury intrusion curves using Washburn's law (macropore region), also well known to the skilled person.

The reason for such a choice is explained by the fact that the steam present in the bed of adsorbant in particular in steps 3 and 4 may result in the phenomenon of capillary condensation in the mesopores of the activated charcoal, in particular if the temperature of the superheated water drops to substantially the dew point at the pressure under consideration. The relative pressure of the steam which may give rise to this capillary condensation phenomenon in the mesopores may be calculated using Kelvin's equation using the parameters relating to water. Reference in this regard should, for example, be made to the works by S J Gregg and K S W Sing (Adsorption, Surface Area and Porosity) and by J Rouquérol et al (Adsorption by Powders and Porous Solids).

The activated charcoals used in the context of the invention are formed into granules, for example, with a diameter which is, for example, in the range 0.5 to 5 mm, or extrudates with a length of approximately 0.5 to several mm, or crushed material with characteristic dimensions of a few millimeters.

The microporous volume of the activated charcoal is, for example, in the range 0.05 to 0.80 cm³/g determined, for example, by nitrogen adsorption at 77K using the t-plot method or using Dubinin's equation or variations thereof.

The mesoporous volume is preferably in the range 0.05 to 0.30 cm³/g, determined by nitrogen adsorption at 77K at a relative pressure $P/P_0$ close to 0.98-0.99 reduced to the microporous volume.

The macroporous volume is preferably in the range 0.10 to 0.50 cm³/g, determined by mercury intrusion.

Examples of activated charcoals satisfying this criterion which may be cited are the activated charcoal AC35/3 from Ceca/Arkema, and the activated charcoals PicaCarb E460-E and Picactif TA60 or TA90 from Pica Carbon.

In this example, 400 MW of electricity was produced with no $CO_2$ emission and with a methane recycle.

It should be clear to the skilled person that the present invention must not be limited to the details given above and allows implementations of many other specific forms without departing from the field of application of the invention. As a result, the present implementations should be considered to be by way of illustration, and may be modified without departing in any way from the scope as defined by the accompanying claims.

The entire disclosures of all applications, patents and publications, cited herein and of corresponding French application Ser. No. 08/05.390, filed Sep. 29, 2008 are incorporated by reference herein.

The preceding examples can be repeated with similar success by substituting the generically or specifically described reactants and/or operating conditions of this invention for those used in the preceding examples.

The invention claimed is:

1. A process for producing hydrogen from a hydrocarbon feed and steam, comprising:
   A. a step for producing a synthesis gas in a unit for steam reforming the hydrocarbon feed in the presence of steam, with a fuel providing the heat necessary for the reaction;
   B. a step for steam converting synthesis gas obtained in the preceding step, producing a stream of hydrogen containing methane and carbon dioxide;
   C. a step for capturing carbon dioxide present in the stream obtained from the steam converting step in order to separate the carbon dioxide from the stream of hydrogen;
   D. a step for capturing and recycling impurities present in the stream of hydrogen to the steam reforming step (A), wherein step (D) is carried out in an adsorption unit comprising at least two adsorbers and comprises at least one of the following successive phases:
   i adsorbing the impurities on the first adsorber;
   ii regenerating the first adsorber and adsorbing the impurities on the second adsorber comprising the following steps:
      isolating the adsorber when it is saturated and bringing the second adsorber on-line;
      flushing the first adsorber with a stream of a hydrocarbon and heating the first adsorber by exchange with steam, to a temperature which is at least 20° C. higher than the steam condensation temperature and wherein the stream of a hydrocarbon and the steam which heats the adsorber both feed the steam reforming unit;
      regenerating the heated adsorber and desorbing the impurities by circulating steam superheated by at least 20° C. prior to being passed to the steam reforming unit;
      eliminating steam present in the regenerated adsorber by flushing the adsorber with a stream of purified hot hydrogen which is at a temperature of at least 20° C. higher than the condensation temperature of steam at the operating pressure;
      flushing the adsorber freed of steam with a stream of purified cold hydrogen which is at a temperature of 20° C. to 100° C.

2. A process for producing hydrogen according to claim 1, in which the step for adsorption of the impurities is carried out at a temperature in the range of 20° C. to 100° C.

3. A process for producing hydrogen according to claim 2, in which the adsorption step is carried out with an activated charcoal or a carbon molecular sieve type adsorbant.

4. A process for producing hydrogen according to claim 1, in which the hydrocarbon feed is natural gas.

5. A process for producing hydrogen according to claim 1, in which the adsorption step is carried out with a charcoal prepared by physical steam activation.

6. A process for producing hydrogen according to claim 1, in which the adsorption step is carried out with an activated charcoal containing micropores with a diameter of less than 2 nm, macropores with a diameter of more than 50 nm, and a smaller quantity of mesopores with a diameter in the range of 2 to 50 nm.

7. A process for producing hydrogen according to claim 1, in which the adsorbed impurities are methane, carbon dioxide and carbon monoxide.

8. A process for producing hydrogen according to claim 1, in which a portion of resultant hydrogen stream saturated with steam obtained after flushing the regenerated adsorber and which is at a temperature of at least 20° C. higher than the condensation temperature of steam at the operating pressure is sent to burners for the reforming unit, and another portion of the stream is sent as a mixture with diluting steam to a gas turbine in order to produce electricity.

9. A process for producing hydrogen according to claim 1, in which a portion of resultant hydrogen stream obtained after flushing the regenerated adsorber and which is at a temperature of 20° C. to 100° C. is sent to an external unit and heating another portion of the hydrogen to a temperature of at least 20° C. higher than the condensation temperature of steam at the operating pressure for flushing then sent to the burners of the reforming unit.

10. A process for producing hydrogen according to claim 9, in which the heated hydrogen stream obtained after an absorber cooling phase is reheated again by exchange with steam and eliminating steam present in the adsorber with the reheated stream.

11. A process for producing hydrogen according to claim 1, in which the synthesis gas production step is carried out at a pressure in the range of 2.5 MPa to 3.5 MPa.

12. A process for producing hydrogen according to claim 1, in which the carbon dioxide capture step is carried out in an amine unit into methyldiethylamine and at least one other amine.

13. A process for producing hydrogen according to claim 1, in which the heated hydrogen stream obtained after an adsorber cooling phase is reheated again by exchange with steam and eliminating steam present in the adsorber with the reheated hydrogen stream.

* * * * *